United States Patent
Liang et al.

(10) Patent No.: US 11,919,978 B2
(45) Date of Patent: Mar. 5, 2024

(54) HYDRATE KINETICS INHIBITOR

(71) Applicant: GUANGZHOU INSTITUTE OF ENERGY CONVERSION, CHINESE ACADEMY OF SCIENCES, Guangzhou (CN)

(72) Inventors: Deqing Liang, Guangzhou (CN); Li Wan, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 255 days.

(21) Appl. No.: 17/257,318

(22) PCT Filed: Dec. 27, 2018

(86) PCT No.: PCT/CN2018/124218
§ 371 (c)(1),
(2) Date: Jul. 26, 2021

(87) PCT Pub. No.: WO2020/118780
PCT Pub. Date: Jun. 18, 2020

(65) Prior Publication Data
US 2022/0089796 A1    Mar. 24, 2022

(30) Foreign Application Priority Data
Dec. 14, 2018    (CN) .......................... 201811535390.7

(51) Int. Cl.
| | | |
|---|---|---|
| *C08F 126/06* | (2006.01) | |
| *C08F 8/34* | (2006.01) | |
| *C08K 5/315* | (2006.01) | |
| *C09K 8/524* | (2006.01) | |

(52) U.S. Cl.
CPC ............ *C08F 126/06* (2013.01); *C08F 8/34* (2013.01); *C08K 5/315* (2013.01); *C09K 8/524* (2013.01); *C08F 2810/40* (2013.01); *C09K 2208/22* (2013.01)

(58) Field of Classification Search
CPC .......... C08F 8/34; C08F 26/06; C08F 126/06; C08F 2810/40
See application file for complete search history.

(56) References Cited

FOREIGN PATENT DOCUMENTS

| | | | | |
|---|---|---|---|---|
| CN | 1685130 | A | 10/2005 | |
| CN | 101602940 | A | 12/2009 | |
| CN | 107868156 | A | 4/2018 | |
| CN | 108070063 | A | 5/2018 | |
| CN | 108659207 | A * | 10/2018 | ............. A61K 47/34 |
| CN | 108659207 | A | 10/2018 | |
| EP | 0855412 | A2 * | 7/1998 | |
| EP | 1101625 | A2 | 5/2001 | |
| GB | 916551 | A | 1/1963 | |
| WO | 03004541 | A1 | 1/2003 | |
| WO | 2014116560 | A1 | 7/2014 | |

OTHER PUBLICATIONS

Kudyshkin, V.O. et al. Russian Journal of Applied Chemistry vol. 75(9) pp. 1465-1467 (Year: 2002).*
Seo, S.D. et al. Energy & Fuels vol. 31 pp. 6358-6363 (Year: 2017).*

* cited by examiner

*Primary Examiner* — Irina S Zemel
*Assistant Examiner* — Jeffrey S Lenihan
(74) *Attorney, Agent, or Firm* — Bayramoglu Law Offices LLC

(57) ABSTRACT

A hydrate kinetic inhibitor, which is prepared by a polymerization of mercaptoethanol and N-vinylcaprolactam, is hydroxyl terminated poly(N-vinylcaprolactam) having a structure of formula (I) below, wherein n=10 to 1000. The inhibitor is a novel hydrate kinetic inhibitor, which has low effective concentration and high cloud point, and is effective when the degree of supercooling is relatively high.

formula (I)

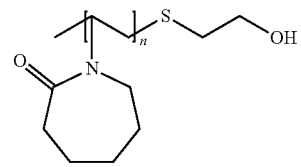

1 Claim, 3 Drawing Sheets

HYDRATE KINETICS INHIBITOR

CROSS REFERENCE TO THE RELATED APPLICATIONS

This application is the national phase entry of International Application No. PCT/CN2018/124218, filed on Dec. 27, 2018, which is based upon and claims priority to Chinese Patent Application No. 201811535390.7, filed on Dec. 14, 2018, the entire contents of which are incorporated herein by reference.

TECHNICAL FIELD

The present invention relates to the technical field of hydrates, and particularly relates to a hydrate kinetic inhibitor.

BACKGROUND

Natural gas hydrates are ice-like and non-stoichiometric clathrate. Hydrates formed during the transportation and processing of natural gas will bring a variety of problems, such as pipeline blockage, BOP blockage which may cause damages to deep sea platform, and even pipeline rapture under extreme conditions which may cause huge casualties, economic losses, and environmental damages. Thus, how to effectively prevent the formation of hydrates and avoid accidents caused by blockage is a very important and urgent issue for the oil and gas industry.

At present, injecting additives into the pipelines is a relatively effective and economical method for controlling hydrates. These chemical additives are known as hydrate inhibitors. Thermodynamic hydrate inhibitors (This) prevent the formation of hydrates by changing the thermodynamic conditions, such as lowering the hydrate formation temperature or increasing the formation pressure; they can disrupt the hydrogen bonding by the hydrates. However, use of THIs requires an injection volume of up to 10% to 50% for effective inhibition, which is costly and cause huge environmental damages. In addition, THIs are usually volatile and thereby easily mixed with the gas, which increases refinement costs and chemical losses. In consideration of environmental, technical, and economic factors, THIs are gradually being replaced by novel low-dosage hydrate inhibitors (including kinetic inhibitors and anti-agglomerant agents). Anti-agglomerant agents realize hydrate prevention by dispersing hydrate particles and preventing particle agglomeration so as to maintain flowable slurry in the pipelines. However, due to its limited dispersing capacity and its environmental toxicity, industrial application of AAs has been constrained. Kinetic inhibitors, by slowing down or stopping the formation and growth of hydrates without altering the thermodynamic conditions for hydrate formation, ensure sufficient time for pipeline flow to pass through the hydration zone, and realize the inhibitory effect.

Kinetic inhibitors are usually water-soluble polymers, and some of them have been industrially applied, including polyvinylpyrrolidone (PVP) and polyvinylcaprolactam (PVCap), which have been used as standard models for assessing the performance of other inhibitors. However, despite their effective inhibitory on hydrates, they have not been applied widely because of the following reasons: (1) They have relatively low cloud points; and (2) They are not suitable when the degree of supercooling is high. Thus, modifying these polymers for increasing their inhibitory performance and cloud points requires immediate solutions.

SUMMARY

One object of the present invention is to provide a novel hydrate kinetic inhibitor, which has low effective concentration and high cloud point, and is effective when the degree of supercooling is relatively high.

The hydrate kinetic inhibitor is hydroxyl terminated poly(N-vinylcaprolactam), having a structure of formula (I), wherein n=10 to 1000,

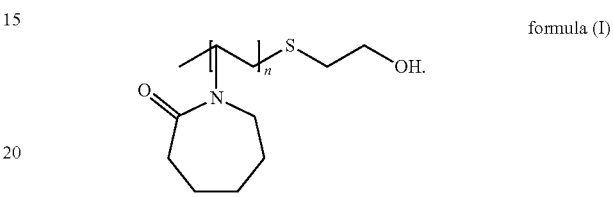

A hydroxyl group is introduced to the backbone of poly(N-vinylcaprolactam) to form the hydroxyl terminated polyvinylcaprolactam (PVCap-OH), which has higher cloud point and better inhibitory performance, and can be applied under a higher degree of supercooling, as compared with normal polyvinylcaprolactam (PVCap).

Preferably, the hydroxyl terminated poly(N-vinylcaprolactam) is produced by polymerization of mercaptoethanol and N-vinylcaprolactam.

Preferably, the hydroxyl terminated poly(N-vinylcaprolactam) has a number average molecular weight ($M_n$) of 1000-10000 Da, and a polydispersity index of 1.05-1.4.

The present invention also provides a method for producing the above hydrate kinetic inhibitor, which comprises: sequentially adding a chain initiator, N-vinylcaprolactam, mercaptoethanol, and a solvent into a reactor, wherein a molar ratio of mercaptoethanol to N-vinylcaprolactam is 1:100-1:10, stirring until dissolved, and reacting under a nitrogen atmosphere at 30° C. to 90° C. for 6-40 hours to obtain a reaction solution; drying the reaction solution by rotary evaporation, and cooling to room temperature to obtain a crude product; washing the crude product, and sieving and drying to obtain the hydrate kinetic inhibitor.

Preferably, the chain initiator is azobisisobutyronitrile, the solvent is isopropanol, a solid-to-liquid ratio of N-vinylcaprolactam to isopropanol is 1:1-20 g/mL, and a molar ratio of azobisisobutyronitrile to N-vinylcaprolactam is 0.005-0.02:1.

Preferably, the step of drying the reaction solution by rotary evaporation is conducted at 30° C. to 85° C.

Preferably, the method comprises: sequentially adding the chain initiator, N-vinylcaprolactam, mercaptoethanol, and isopropanol into the reactor, wherein the molar ratio of mercaptoethanol to N-vinylcaprolactam is 1:20, the molar ratio of azobisisobutyronitrile to N-vinylcaprolactam is 0.01:1, and the solid-to-liquid ratio of N-vinylcaprolactam to isopropanol is 1:15 g/mL, and stirring until dissolved; sealing the reactor using a rubber plug, and performing three cycles of vacuumizing and introducing nitrogen; reacting under the nitrogen atmosphere at 85° C. for 24 hours to obtain the reaction solution; drying the reaction solution by rotary evaporation at 50° C., and cooling to room temperature to obtain a crude product; dissolving the crude product in tetrahydrofuran and precipitating using n-hexane to obtain a precipitate; washing the precipitate with anhydrous ether, and sieving and drying to obtain the hydrate kinetic inhibitor. In the step of dissolving the crude product in tetrahydrofuran, a solid-to-liquid ratio of the crude product to tetrahydrofuran is 1:1-5 g/mL and preferably 1:3 g/mL, and a volume of isopropanol is 2-10 times of a volume of tetrahydrofuran. Further, the solid-to-liquid ratio of the crude product to tetrahydrofuran is 1:3 g/mL.

The present invention also provides the use of the hydrate kinetic inhibitor.

Preferably, the hydrate kinetic inhibitor is used in inhibiting hydrate formation in an oil-gas-water three-phase system, an oil-water two-phase system, or a gas-water two-phase system.

Preferably, the use of the hydrate kinetic inhibitor is conducted at a pressure of 1-25 MPa and a temperature of −25° C. to 25° C., wherein the hydrate kinetic inhibitor is provided as an aqueous solution having a concentration of 0.1-20 wt %. Further preferably, the hydrate kinetic inhibitor is provided as an aqueous solution having a concentration of 0.25-1 wt %.

Compared with prior art, the present invention has the following advantages:

(1) A hydroxyl group is introduced to the backbone of poly(N-vinylcaprolactam) to form the hydroxyl terminated polyvinylcaprolactam (PVCap-OH), which has higher cloud point and better inhibitory performance, and can be applied under a higher degree of supercooling, as compared with normal polyvinylcaprolactam (PVCap).

(2) The hydrate kinetic inhibitor of the present invention is effective at a concentration largely lower than other conventional thermodynamic hydrate inhibitors, generally 0.1-20 wt %. Such low effective concentration can largely reduce the cost.

(3) The hydrate kinetic inhibitor is applicable for inhibiting hydrate formation in oil-gas-water three-phase systems, oil-water two-phase systems, or gas-water two-phase systems during exploitation, processing, and transportation, giving excellent inhibitory effect. Also, the low effective concentration reduces the cost. Thus, the inhibitor has broad application prospects.

DETAILED DESCRIPTION OF THE EMBODIMENT

Figure 1:
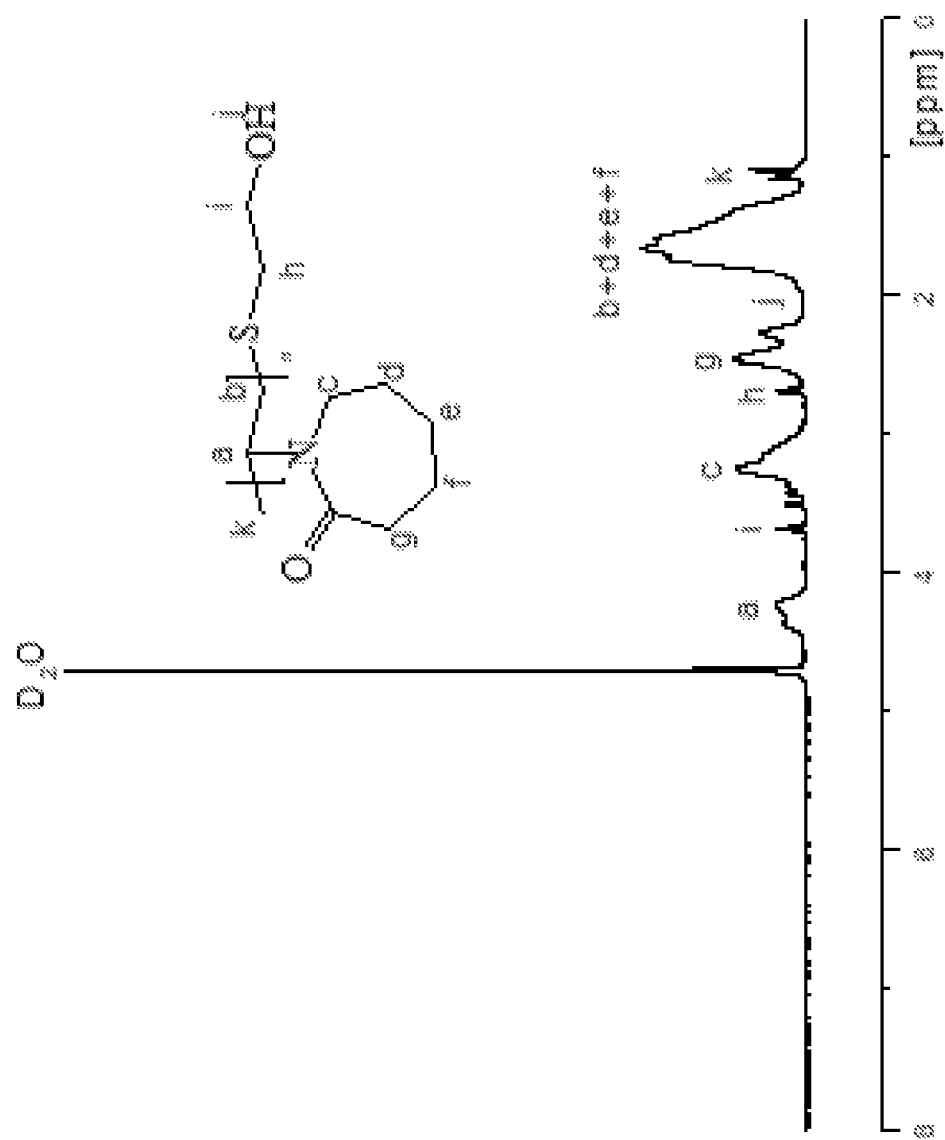
FIG. 1 is a $^1$H NMR spectrogram (D20 as solvent) of the hydroxyl terminated polyvinylcaprolactam (PVCap-OH) produced in Example 1.
Figure 2:
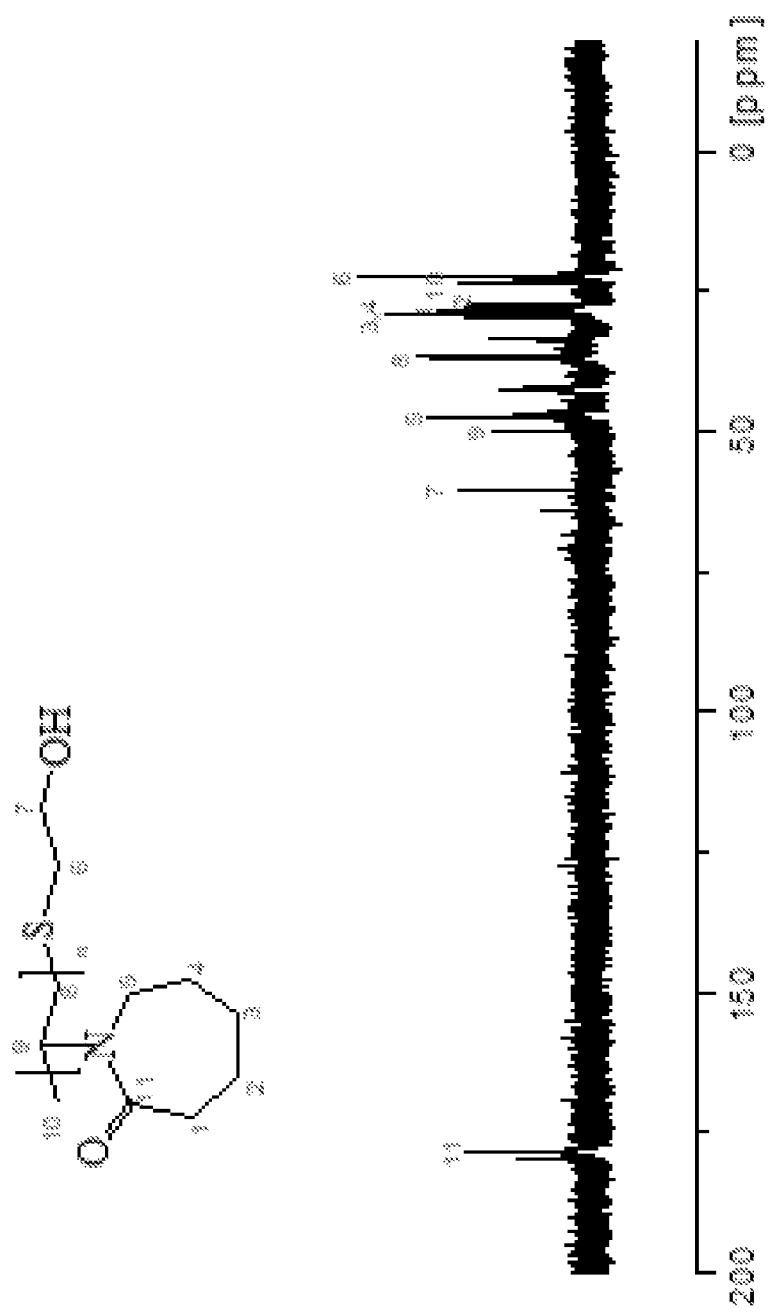
FIG. 2 is a $^{13}$C NMR spectrogram (D20 as solvent) of the hydroxyl terminated polyvinylcaprolactam (PVCap-OH) produced in Example 1.
Figure 3:
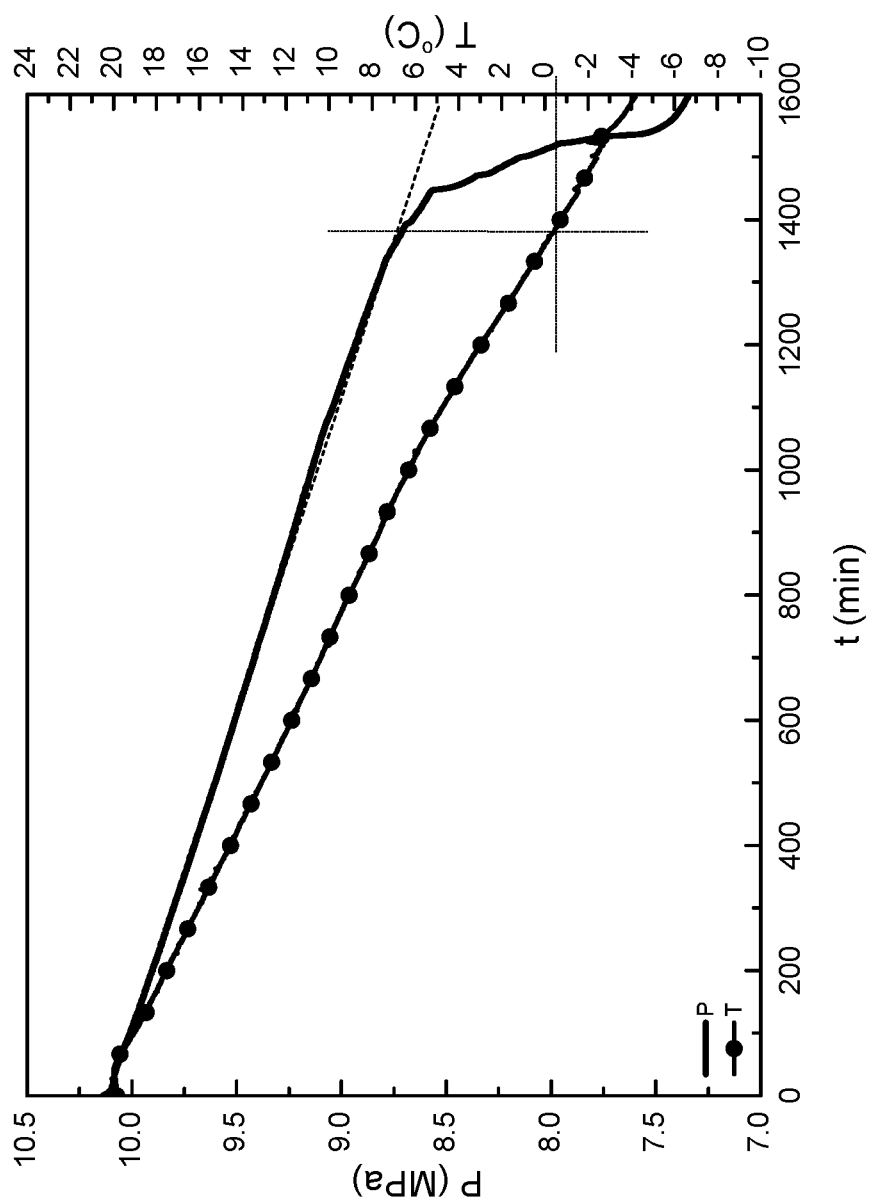
FIG. 3 shows the time-temperature and time-pressure curves during a hydrate formation process in a 1.0 wt % aqueous solution of the hydroxyl terminated polyvinylcaprolactam produced in Example 1.

The following examples are to further illustrate the present invention, but not to limit the present invention.

In the experimental schemes described below, parameters not specified are set according to conventional practices, and reagents or materials not specified are commercially available.

Example 1

The hydroxyl terminated polyvinylcaprolactam (PVCap-OH) was produced by:

sequentially adding 118 mg (0.72 mmol) of azobisisobutyronitrile, 10 g (72 mmol) of N-vinylcaprolactam, 280 mg (3.6 mmol) of mercaptoethanol, and 150 mL of isopropanol into a 250 mL three-neck flask, and stirring until dissolved; sealing the flask using a rubber plug, and performing three cycles of vacuumizing and introducing nitrogen; reacting under a nitrogen atmosphere at 85° C. for 24 hours to obtain a reaction solution; drying the reaction solution by rotary evaporation at 50° C., and cooling to room temperature to obtain a crude product; dissolving the crude product in tetrahydrofuran and precipitating using n-hexane to obtain a precipitate, wherein a solid-to-liquid ratio of the crude product to tetrahydrofuran was 1:3 g/mL, and a volume of isopropanol was 5 times of a volume of tetrahydrofuran; washing the precipitate with a large amount of anhydrous ether, and sieving and drying to obtain the hydrate kinetic inhibitor PVCap-OH.

The hydrate kinetic inhibitor PVCap-OH so produced was subjected to hydrogen/carbon NMR analysis and thereby determined to be hydroxyl terminated polyvinylcaprolactam having a structure of formula (I),

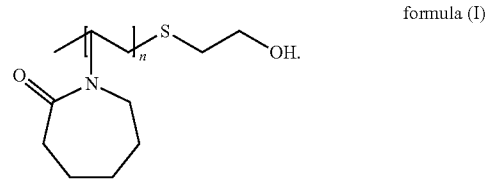

formula (I)

The hydrate kinetic inhibitor PVCap-OH was subjected to gel permeation chromatography (GPC) and the GPC results were as shown in Table 1.

TABLE 1

| Name | number average molecular weight ($M_n$) | polydispersity index ($M_w/M_n$) |
| --- | --- | --- |
| PVCap-OH | 4095 Da | 1.06 |

Example 2

The hydroxyl terminated polyvinylcaprolactam (PVCap-OH) was produced by:

sequentially adding 0.36 mmol of azobisisobutyronitrile, 72 mmol of N-vinylcaprolactam, 0.72 mmol of mercaptoethanol, and 10 mL of isopropanol into a 250 mL three-neck flask, and stirring until dissolved; sealing the flask using a rubber plug, and performing three cycles of vacuumizing and introducing nitrogen; reacting under a nitrogen atmosphere at 30° C. for 40 hours to obtain a reaction solution; drying the reaction solution by rotary evaporation at 30° C., and cooling to room temperature to obtain a crude product; dissolving the crude product in tetrahydrofuran and precipitating using n-hexane to obtain a precipitate, wherein a solid-to-liquid ratio of the crude product to tetrahydrofuran was 1:1 g/mL, and a volume of isopropanol was 2 times of a volume of tetrahydrofuran; washing the precipitate with a large amount of anhydrous ether, and sieving and drying to obtain the hydrate kinetic inhibitor PVCap-OH.

Example 3

The hydroxyl terminated polyvinylcaprolactam (PVCap-OH) was produced by:

sequentially adding 0.36 mmol of azobisisobutyronitrile, 72 mmol of N-vinylcaprolactam, 7.2 mmol of mercaptoethanol, and 200 mL of isopropanol into a 250 mL three-neck flask, and stirring until dissolved; sealing the flask using a rubber plug, and performing three cycles of vacuumizing and introducing nitrogen; reacting under a nitrogen atmosphere at 90° C. for 6 hours to obtain a reaction solution; drying the reaction solution by rotary evaporation at 85° C., and cooling to room temperature to obtain a crude product; dissolving the crude product in tetrahydrofuran and precipitating using n-hexane to obtain a precipitate, wherein a solid-to-liquid ratio of the crude product to tetrahydrofuran was 1:5 g/mL, and a volume of isopropanol was 10 times of a volume of tetrahydrofuran; washing the precipitate with a large amount of anhydrous ether, and sieving and drying to obtain the hydrate kinetic inhibitor PVCap-OH.

Comparative Example 1

The polyvinylcaprolactam (PVCap) was produced by:

sequentially adding 118 mg (0.72 mmol) of azobisisobutyronitrile, 10 g (72 mmol) of N-vinylcaprolactam, and 150 mL of isopropanol into a 250 mL three-neck flask, and stirring until dissolved; sealing the flask using a rubber plug, and performing three cycles of vacuumizing and introducing nitrogen; reacting under a nitrogen atmosphere at 85° C. for 24 hours to obtain a reaction solution; drying the reaction solution by rotary evaporation at 50° C., and cooling to room temperature to obtain a crude product; dissolving the crude product in tetrahydrofuran and precipitating using n-hexane to obtain a precipitate, wherein a solid-to-liquid ratio of the crude product to tetrahydrofuran was 1:3 g/mL, and a volume of isopropanol was 5 times of a volume of tetrahydrofuran; washing the precipitate with a large amount of anhydrous ether, and sieving and drying to obtain the hydrate kinetic inhibitor PVCap.

Comparative Example 2

Pure water was added to a kettle to determine the maximum supercooling degree of hydrate formation without the addition of hydrate kinetic inhibitors.

Measurement

The inhibitory effect of the hydrate kinetic inhibitor of each example/comparative example was measured by the following scheme.

The measurement was conducted using a device which mainly comprised a sapphire high-pressure reactor, a magnetic stirrer, a low-temperature air bath, temperature and pressure sensors, a vacuum pump, a high-pressure gas cylinder, and a data collector. The sapphire high-pressure reactor was able to operate at a maximum pressure of 11 MPa, a temperature of −30° C. to 80° C. The pressure inside the sapphire high-pressure reactor could be regulated by a gas valve. The low-temperature air bath was configured to provide a jacket of the reactor with a condition of −30° C. to 80° C. The data collector was configured to collect and store the pressure and temperature data from inside the reactor in real time. Hydrate formation could be determined from the sharp change in temperature or pressure during reaction or by direct observation. After the reaction began, the time point of sudden drop of pressure (i.e., when the trend of pressure drop deviated from the original trend) was regarded as the beginning of hydrate formation, wherein the maximum supercooling degree was calculated by subtracting the hydrate thermodynamic equilibrium temperature corresponding to the pressure from the temperature corresponding to this time point. Under constant stirring rate, after the temperature in the sapphire high-pressure reactor was constant, methane gas was introduced into the reactor until the pressure therein reached a predetermined value, and then the gas valve was turned off. Then, the temperature inside the reactor was lowered at a constant rate (e.g., 1° C./h) to below the hydrate formation temperature corresponding to the pressure. The maximum supercooling degree for the solution was calculated by subtracting the corresponding thermodynamic equilibrium temperature from the hydrate formation temperature. The performance of the novel inhibitor can be evaluated by the maximum supercooling degree for a solution containing the inhibitor. A higher maximum supercooling degree means a better inhibitory effect.

The cloud point was measure by using a constant-temperature water bath with an operation temperature of −30° C. to 80° C. The measurement was conducted by immersing a test tube containing a sample solution into the water bath, and measuring the water-bath temperature in real time by using the data collector. The cloud point was defined as the temperature at which the sample solution began to change from clear to turbid. A higher cloud point means a better performance.

Detailed Process:

Before the measurement, the reactor was washed three to five times with deionized water, and then the reactor and pipelines were purged with nitrogen to ensure the system was dried. The reactor was then vacuumized, followed by the addition of 10 mL (about ⅓ of the volume of the reactor) of deionized water or inhibitor solution. In order to eliminate air in the reactor, three cycles of introducing 1 MPa of 99.99% methane gas and vacuumizing were conducted. Under a constant stirring rate of 800 rpm, after the temperature in the sapphire high-pressure reactor was 20° C., methane gas was introduced into the reactor until the pressure therein was constantly 10.0 MPA, and then the gas valve was turned off. Then, the temperature inside the reactor was lowered at a rate of 1° C./h from 20° C. to −10° C. The occurrence of hydrate formation was determined by the temperature/pressure curves.

The cloud point measurement was performed by immersing a test tube containing a 1 wt % sample solution into the water bath, and increasing the temperature at a rate of 0.5° C./min. The temperature where the solution began to turn turbid was defined as the cloud point.

The measurement for cloud point and maximum supercooling degree was conducted with 0.25 wt %, 0.5 wt %, and 1 wt % aqueous solutions of the inhibitors of Example 1, Comparative Example 1, and Comparative Example 2 (as blank control). Results were as shown in Table 2

TABLE 2

| Concentration | Example 1 | | | Comparative Example 1 | | | Comparative Example 2 |
|---|---|---|---|---|---|---|---|
| | 0.25 wt % | 0.5 wt % | 1 wt % | 0.25 wt % | 0.5 wt % | 1 wt % | |
| Maximum supercooling degree (° C.) | 11.4 | 12 | 12.9 | 8.9 | 10.4 | 11.8 | 4.7 |

TABLE 2-continued

| | Example 1 | | | Comparative Example 1 | | | |
|---|---|---|---|---|---|---|---|
| Concentration | 0.25 wt % | 0.5 wt % | 1 wt % | 0.25 wt % | 0.5 wt % | 1 wt % | Comparative Example 2 |
| Cloud point (° C.) | | 51.7 | | | 41.1 | | |

As can be concluded from Table 2, under identical conditions, Example 1 exhibited a cloud point of 51.7° C. while the Comparative Example 1 exhibited a cloud point of 41.1° C., indicating that the inhibitor of the present invention has a higher cloud point than prior art inhibitors. As to the inhibitory effect, Example 1 exhibited higher maximum supercooling degrees than Comparative Example 1 at identical concentrations, and much higher than Comparative Example 1 (blank control). For example, the maximum supercooling degree was 11.4° C. for Example 1 at 0.25 wt %, higher than those for Comparative Example 1 at 0.25 wt % and 0.5 wt %, and close to that for Comparative Example 1 at 1 wt %, indicating that the inhibitory effects of the present invention and the prior art inhibitor are close when the prior art inhibitor is provided at a concentration four times that of the present invention. In summary, the modification largely improves the inhibitor in both aspects.

The above examples are preferred embodiments of the present invention, but the embodiments of the present invention are not limited by the above examples. Any other changes, modifications, substitutions, combinations, or simplifications, made without departing from the spirit and principle of the present invention, shall fall within the scope of the present invention.

We claim:

1. A method for producing a hydrate kinetic inhibitor, wherein the hydrate kinetic inhibitor is hydroxyl terminated poly(N-vinylcaprolactam) having a structure of formula (I), and n=10 to 1000,

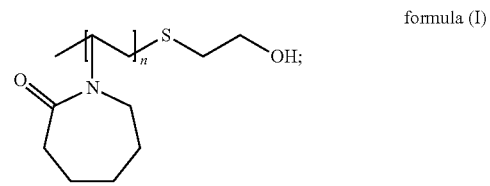

formula (I)

the method comprising:
sequentially adding a chain initiator, a N-vinylcaprolactam, a mercaptoethanol, and a isopropanol into the reactor, wherein the molar ratio of the mercaptoethanol to the N-vinylcaprolactam is 1:20, the chain initiator is azobisisobutyronitrile, a molar ratio of the azobisisobutyronitrile to the N-vinylcaprolactam is 0.01:1, and a solid-to-liquid ratio of the N-vinylcaprolactam to the isopropanol is 1:15 g/mL, and stirring until dissolved; sealing the reactor using a rubber plug, and performing three cycles of vacuumizing and introducing nitrogen; reacting under the nitrogen atmosphere at 85° C. for 24 hours to obtain the reaction solution; drying the reaction solution by the rotary evaporation at 50° C., and cooling to the room temperature to obtain the crude product; dissolving the crude product in tetrahydrofuran and precipitating using n-hexane to obtain a precipitate; washing the precipitate with anhydrous ether, and sieving and drying to obtain the hydrate kinetic inhibitor.

* * * * *